United States Patent [19]

Eshler et al.

[11] Patent Number: 4,998,780
[45] Date of Patent: Mar. 12, 1991

[54] WHEEL TRIM RETENTION

[75] Inventors: Mark S. Eshler, Howell; Jon D. Parisen, Troy, both of Mich.; Martin E. Russell, White House, Tenn.

[73] Assignee: Saturn Corporation, Troy, Mich.

[21] Appl. No.: 415,751

[22] Filed: Oct. 2, 1989

[51] Int. Cl.⁵ .............................................. B60B 7/12
[52] U.S. Cl. ................................... 301/37 S; 301/108 S
[58] Field of Search .................. 301/37 R, 37 S, 37 P, 301/9 DN, 108 R, 108 S, 108 A

[56] References Cited

U.S. PATENT DOCUMENTS

| | | | |
|---|---|---|---|
| 2,031,092 | 2/1936 | Begg | 301/37 S |
| 3,356,421 | 12/1967 | Trevarrow, Jr. | 301/37 S |
| 3,549,204 | 12/1970 | Spisak | 301/37 S |
| 3,561,820 | 2/1971 | Chaivre | 301/37 S X |
| 4,268,090 | 5/1981 | Rush | 301/37 R X |
| 4,787,681 | 11/1988 | Wang et al. | 301/37 S |

Primary Examiner—Russell D. Stormer
Attorney, Agent, or Firm—Herbert Furman

[57] ABSTRACT

A wheel cover retention system includes a series of plastic caps carried by the wheel cover. The caps have integral flanges engageable with flanges of the cover to hold the cover against the vehicle wheel when the caps are threaded on exteriorly threaded lug nuts of the wheel. The caps have integral legs which extend therefore through the cover with these legs having barbed ends to prevent separation of the caps from the cover. Interlocking ribs on the cap flanges and cover flanges resist relative rotation between such flanges when they are engaged to resist unthreading of the plastic caps from the lug nuts when the wheel cover is mounted to the wheel.

5 Claims, 1 Drawing Sheet

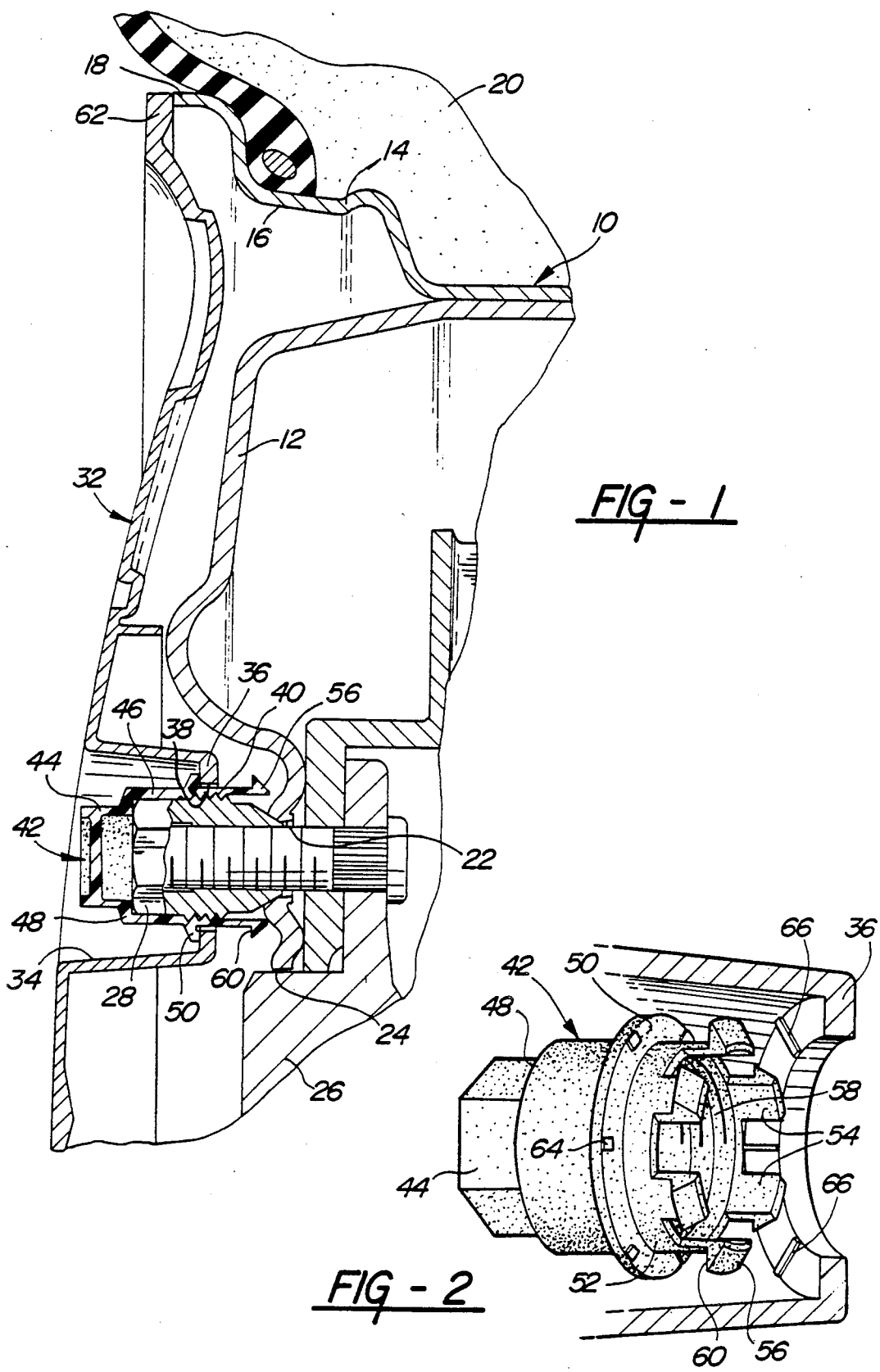

WHEEL TRIM RETENTION

This invention relates to the retention of plastic wheel covers on vehicle wheels and more particularly to the retention of plastic wheel covers on vehicle wheels by decorative caps which are carried by the wheel cover and cooperate with the wheel lug nuts to retain the cover thereon.

It is known to retain wheels on vehicles by lug nuts, either non-locking or locking, which thread to the lugs of the vehicle. It is also known to provide decorative plastic caps which thread over threaded exterior portions of such lug nuts to conceal the lug nuts and cooperate with a wheel cover in enhancing the decorative appearance of the vehicle wheel.

This invention provides a wheel cover retention system which includes decorative plastic caps carried by the wheel cover and threadedly cooperable with exteriorly threaded lug nuts of the vehicle wheel to retain the cover thereon. The plastic caps provide for ease of attachment of the wheel cover to the vehicle wheel since they cannot be lost or misplaced and are always readily available for use. Additionally, when the plastic caps are fully threaded on the lug nuts the plastic caps and wheel cover cooperate to resist relative rotation therebetween and unthreading of the plastic caps from the lug nuts.

In the preferred embodiment of the invention, a plastic wheel cover is provided with a number of openings which are slightly larger than the exteriorly threaded wheel lug nuts which project through such openings. Each wheel cover opening is surrounded by a cover flange. A plastic cap is provided for each wheel cover opening. Each such cap has a radial flange having an axially inner side facing the axially outer side of a respective cover flange, a skirt portion extending from the axially inner side of the cap flange through the wheel cover opening, and a series of integral legs extending axially inwardly from the skirt portion to the axially inner side of the cover flange. The cap legs have barbed ends which define a circle having a diameter greater than that of the wheel cover opening. The barbed ends permit axial and rotational movement of the caps relative to the cover and prevent separation of the plastic caps from the wheel cover by engagement with the axially inner side of the cover flange. Since the plastic caps are axially movable and freely rotatable relative to the cover flanges, they are easily threaded to and unthreaded from the exteriorly threaded portions of corresponding lug nuts. Further, since the plastic caps are always assembled to or carried by the wheel cover, they are readily available whenever it is desired to mount the wheel cover on the wheel.

Additionally, the axially inner sides of the cap flanges and the axially outer sides of the cover flanges have interlocking ribs which interengage and resist relative rotation therebetween when the caps are fully threaded on the lug nuts to hold the cover against rim portion of the wheel.

The primary feature of this invention is that it provides a wheel cover retention system including a number of plastic caps which are carried by the wheel cover and are threadedly cooperable with exterior threaded portions of the wheel lug nuts which project through openings in the wheel cover to retain the wheel cover on the wheel. Another feature is that each plastic cap has a flange which engages a flange surrounding the wheel cover opening to hold the wheel cover against the wheel, with the engaging flanges having interlocking portions to resist relative rotation therebetween and unthreading of the caps from the lug nuts. A further feature is that each plastic cap has a series of axial legs extending axially inwardly of the wheel cover from the opening therein and having barbed ends engageable with the axially inner side of the cover flange to prevent separation of the plastic cap from the wheel cover and permit both axial and rotational movement of the cap relative to the cover. Yet another feature is that the footed legs of the plastic cap are radially flexible so as to be moved radially inwardly of the cap to provide for insertion of the legs through the opening and ease of assembly of the cap to the wheel cover.

These and other features of the invention will be readily apparent from the following specification and drawing wherein:

FIG. 1 is a partial sectional view of a vehicle wheel having a wheel cover mounted thereon by a wheel cover retention system according to this invention; and, FIG. 2 is a partial perspective view of a portion of FIG. 1.

Referring now to FIG. 1 of the drawings, a vehicle wheel designated generally 10 includes a center disk portion 12 and an outer rim portion 14 having a tire bead flange 16 and a terminal flange 18. A conventional tire 20 has its sidewalls seated on flange 16 and a corresponding flange, not shown of the rim portion 14.

The disk portion 12 of the wheel 10 includes a number of openings 22 arranged radially around a center or pilot opening 24 thereof The pilot opening 24 receives a center portion 26 of the vehicle axle. A conventional non-locking or locking lug nut 28 is threaded on each of the lugs 30 of the vehicle axle to mount the wheel 10 thereon. The tapered inner end of the lug nut engages the disk portion 12 around an opening 22 when the lug nut is fully threaded on a respective lug 30. The foregoing structure is conventional and in production use today.

A wheel cover 32 of plastic material covers the opening of the wheel 10. The cover 32 includes a series of recesses 34 corresponding in number to the number of lug nuts 28, with each such recess having a lower or axially inwardly located cover flange 36 provided with an opening 38. The lug nut 28 has an exteriorly threaded portion 40 which is received through the opening 38 of flange 36.

Referring now to FIG. 2, a plastic cap 42 is provided for each of the lug nuts 28. The cap includes an axially outer hexagonal portion 44, a center circular portion 46 which is joined to the hexagonal portion by a flange 48, and a radial flange 50. A skirt 52 extends axially inwardly from the flange 50, with the skirt 52 being of the same diameter as the center portion 46. A series of axially inwardly extending integral legs 54, extend from the skirt 52 and have inner barbed ends 56.

The skirt 52 and the adjacent portion of the center portion 46 are threaded at 58. The barbed ends 56 define a circle having a diameter larger than that of the openings 38 of the cover flange 36. The plastic caps 42 are assembled to the wheel cover by pressing legs 54 radially inwardly until the barbed ends 56 pass through the openings 38, or axially forcing the barbed ends 56 through openings 38. This assembly is facilitated by the ramped radially outer sides of the barbed ends. Once assembled to the wheel cover 32, the plastic caps 42 will always be carried by the cover. The caps are both axially shiftable and relatively rotatable relative to the cover since the diameter of the skirt portion 52 is less than that of the openings 38. Any attempt to separate the plastic caps from the wheel cover will be prevented by engagement of the radial shoulders 60 of the barbed ends 56 with the axially inner sides of the flange 36.

When the cover 30 is mounted to the wheel 10, the caps 42 are piloted over their respective lug nut 28 and are then threaded onto the lug nuts until the axially inner flanges 50 of the caps seat tightly against the flanges 36 of the cover 32 and hold the outer peripheral portion 62 of the cover against the terminal flange 18 of the rim portion 14 of the wheel. The center portion of the wheel cover 32 is slightly displaced axially inwardly so as to provide a resilient axially outward force. In order to enhance the resistance of the lug nuts 42 to unthreading during the operation of the vehicle, the flange 50 of each lug nut, as shown in FIG. 2, is provided with a series of axially inwardly facing integral ribs 64 and the axially outer side of a respective cover flange 36 is provided with a like series of axially outwardly extending integral ribs 66. The ribs 64 and 66 interlock with each other under the resilient axial outward force of the cover 32 to resist relative rotation therebetween and resist unthreading of the caps 42 from the lug nuts 28.

Thus, this invention provides a wheel cover retention wherein a plastic cap which mount the wheel cover to exteriorly threaded lug nuts are carried by the cover so as would be always readily available for use. The plastic caps are both axially movable and rotatable relative to the cover for ease of mounting the cover. The caps are easily assembled to the cover and cannot be accidentally separated from the cover.

The embodiments of the invention in which an exclusive property or privilege is claimed are defined as follows:

1. In a vehicle having a wheel mounted thereon by a number of lug nuts threaded on lugs of the vehicle, each lug nut having a threaded exterior portion, a wheel cover retention system comprising, in combination, a cover member for the vehicle wheel including a number of apertures through an axially displaceable center portion thereof, each aperture receiving a respective lug nut and being surrounded by a cover flange, a cap member threaded on the threaded exterior portion of each lug nut and including a flange engaging the cover flange to engage an outer portion of the cover member with the rim portion of the vehicle wheel and displace the center portion of the cover axially inwardly to provide an axially outward biasing force, and cooperating means on the cap member flanges and cover member flanges resisting rotation of the cap member flanges relative to the cover member flanges and unthreading of the cap members from the exterior threaded portions of the lug nuts, the rotational resistance of the cooperating means being enhanced by the axially outward biasing force.

2. In a vehicle having a wheel mounted thereon by a number of lug nuts threaded on lugs of the vehicle, each lug nut having a threaded exterior portion, a wheel cover retention system comprising, in combination, a cover member for the vehicle wheel including a number of apertures through an axially displaceable center portion thereof, each aperture receiving a respective lug nut and being surrounded by a cover flange, a cap member threaded on the threaded exterior portion of each lug nut and including a flange engaging the cover flange to engage an outer portion of the cover member with the rim portion of the vehicle wheel and displace the center portion of the cover axially inwardly to provide an axially outward biasing force, and cooperating means on the cap members and cover member retaining the cap members to the cover member when the cap members are unthreaded from the lug nuts and the cover member is dismounted from the vehicle wheel.

3. In a vehicle having a wheel mounted thereon by a number of lug nuts threaded on lugs of the vehicle, each lug nut having a threaded exterior portion, a wheel cover retention system comprising, in combination, a cover member for the vehicle wheel including a number of apertures through an axially displaceable center portion thereof, each aperture receiving a respective lug nut and being surrounded by a cover flange, a cap member threaded on the threaded exterior portion of each lug nut and including a flange engaging the cover flange to engage an outer portion of the cover member with the rim portion of the vehicle wheel and displace the center portion of the cover axially inwardly to provide an axially outward biasing force, and cooperating means on the cap member flanges and cover member flanges resisting rotation of the cap member flanges relative to the cover member flanges and unthreading of the cap members from the exterior threaded portions of the lug nuts, the rotational resistance of the cooperating means being enhanced by the axially outward biasing force, and cooperating means on the cap members and cover member retaining the cap members to the cover member when the cap members are unthreaded from the lug nuts and the cover member is dismounted from the vehicle wheel.

4. In a vehicle having a wheel mounted thereon by a number of lug nuts threaded on lugs of the vehicle, each lug nut having a threaded exterior portion, a wheel cover retention system comprising, in combination, a cover member covering the vehicle wheel and including a number of apertures therethrough, each aperture receiving a respective lug nut therethrough and being surrounded by a peripheral cover flange, cooperating engageable means on the cover member and vehicle wheel locating the cover member axially of the vehicle wheel, a cap member covering each lug nut and including a skirt portion extending through the aperture of the cover member, each cap member and skirt portion being internally threaded to thread on the exterior portion of a respective lug nut, each cap member including a flange engageable with the axially outer side of a respective peripheral cover flange to engage the cooperating means on the cover member and the vehicle wheel, and means extending from the skirt portion of each cap member and engageable with the axially inner side of a respective peripheral cover flange to axially retain the cap members to the cover member when the cap members are unthreaded from the lug nuts and the cover member is dismounted from the vehicle wheel.

5. In a vehicle having a wheel mounted thereon by a number of lug nuts threaded on lugs of the vehicle, each lug nut having a threaded exterior portion, a wheel cover retention system comprising, in combination, a cover member covering the vehicle wheel and including a number of apertures therethrough, each aperture receiving a respective lug nut therethrough and being surrounded by a peripheral cover flange, cooperating engageable means on the cover member and vehicle wheel locating the cover member axially of the vehicle wheel, a cap member covering each lug nut and including a skirt portion extending through the aperture of the cover member, each cap member and skirt portion being internally threaded to thread on the exterior portion of a respective lug nut, each cap member including a flange engageable with the axially outer side of a respective peripheral cover flange to engage the cooperating means on the cover member and the vehicle wheel, and a plurality of axial extensions from the skirt portion of each cap member, the skirt portion and axial extensions permitting axial movement of the cap member within the aperture of the cover member when the cap member is unthreaded from a respective lug nut, and means including stop means on the axial extensions engageable with the axially inner side of the peripheral cover flange to prevent disconnection of the cap members from the cover member.

* * * * *

REEXAMINATION CERTIFICATE (3959th)

United States Patent [19]
Eshler et al.

[11] B1 4,998,780
[45] Certificate Issued Dec. 21, 1999

[54] WHEEL TRIM RETENTION

[75] Inventors: Mark S. Eshler, Howell; Jon D. Parisen, Troy, both of Mich.; Martin E. Russell, White House, Tenn.

[73] Assignees: General Motors Corporation, Detroit, Mich.; Del-Met Corporation, Walton, N.Y.

Reexamination Request:
No. 90/005,209, Jan. 5, 1999

Reexamination Certificate for:
Patent No.: 4,998,780
Issued: Mar. 12, 1991
Appl. No.: 07/415,751
Filed: Oct. 2, 1989

[51] Int. Cl.$^6$ .................................................. B60B 7/14
[52] U.S. Cl. ..................................... 301/37.37; 301/108.4
[58] Field of Search ............................. 301/35.62, 37.1, 301/37.37, 37.42, 108.1, 108.3, 108.4

[56] References Cited

U.S. PATENT DOCUMENTS

| | | | |
|---|---|---|---|
| 4,842,339 | 6/1989 | Roulinson | 301/37.37 |
| 4,895,415 | 1/1990 | Stay et al. | 301/37.37 |

*Primary Examiner*—Russell D. Stormer

[57] ABSTRACT

A wheel cover retention system includes a series of plastic caps carried by the wheel cover. The caps have integral flanges engageable with flanges of the cover to hold the cover against the vehicle wheel when the caps are threaded on exteriorly threaded lug nuts of the wheel. The caps have integral legs which extend therefore through the cover with these legs having barbed ends to prevent separation of the caps from the cover. Interlocking ribs on the cap flanges and cover flanges resist relative rotation between such flanges when they are engaged to resist unthreading of the plastic caps from the lug nuts when the wheel cover is mounted to the wheel.

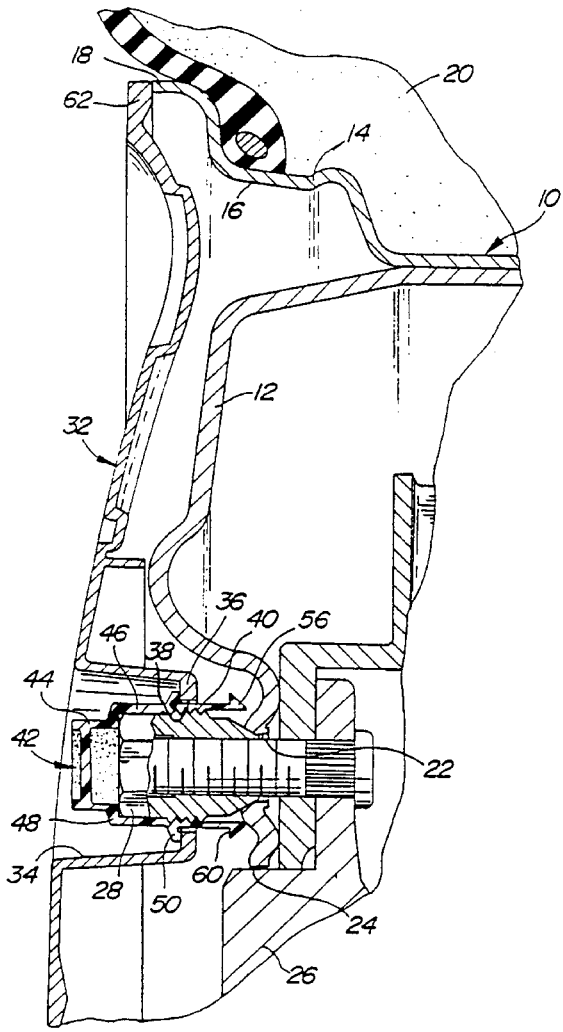

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *